Sept. 21, 1937. O. J. PAWLITSCHEK 2,093,732
ANIMAL GAMBREL
Filed Jan. 6, 1936
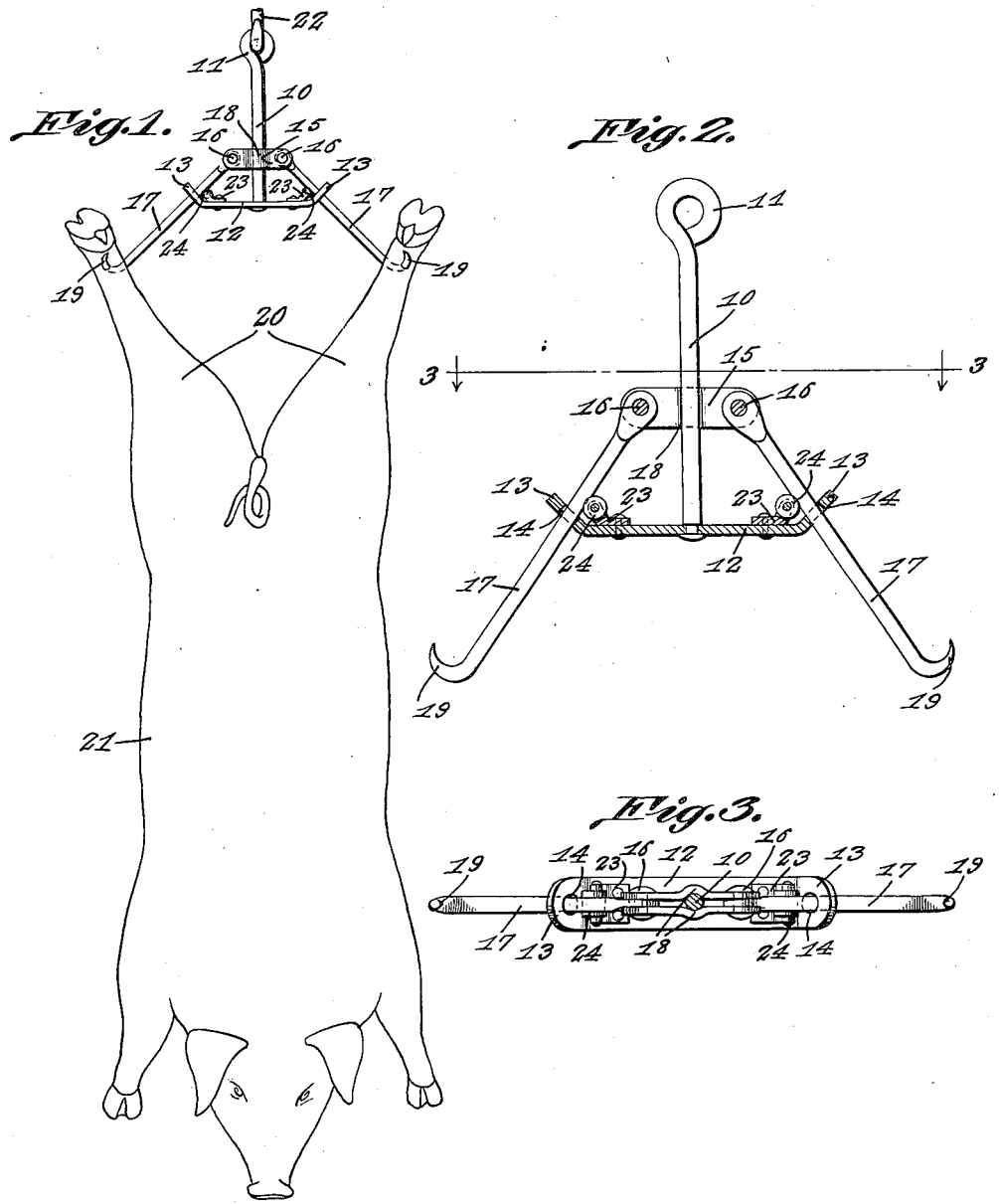
Otto J. Pawlitschek, INVENTOR
BY Victor J. Evans & Co.
ATTORNEY Patented Sept. 21, 1937

2,093,732

UNITED STATES PATENT OFFICE 2,093,732

ANIMAL GAMBREL

Otto J. Pawlitschek, Heron Lake, Minn.

Application January 6, 1936, Serial No. 57,849

2 Claims. (Cl. 294—79)

The invention relates to an animal gambrel and more especially to a hog grapple.

The primary object of the invention is the provision of an article of this character, wherein slaughtered animals can be hung for the support thereof, the article being of novel construction so that the legs of the animal slaughtered can be readily hooked for the suspension of such animal and the hanging thereof in a convenient manner.

Another object of the invention is the provision of an article of this character, which in the application thereof effects the automatic spreading of the legs of the animal when the same are hooked thereto, this spreading being effective by the weight of the animal when suspended by the article.

A further object of the invention is the provision of an article of this character, which is extremely simple in construction, thoroughly reliable and efficient in its purpose, readily and easily applied and removed, strong, durable, automatically adjustable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation of a gambrel or grapple constructed in accordance with the invention showing application to a slaughtered animal.

Figure 2 is an enlarged side elevation partly in section of the gambrel or grapple detached from the animal.

Figure 3 is a sectional view taken on the line 3—3 of Figure 2 looking in the direction of the arrows.

Similar reference characters indicate corresponding parts throughout the several views in the drawing.

Referring to the drawing in detail, the gambrel or grapple comprises a stem or shank 10 terminating at its upper end in an eye 11 while the opposite lower end is riveted or otherwise made fast medially to a saddle 12 having the upturned divergent ends 13, these being formed with holes 14.

Slidably fitting the stem or shank is a runner formed from a pair of companion plates 15 joined together at opposite ends by pivots 16 swingingly supporting hooks 17 which are freely slidable through the holes 14 in the ends 13 of said saddle. The plates 15 have the outstruck centers 18 to effect a guideway for the stem or shank 10.

The pointed bills 19 of the hooks 17 are pierced through the legs 20 of a slaughtered animal 21 for the suspension or hanging of such animal as is clearly shown in Figure 1 of the drawing while the eye end 11 is separably engageable with a suitable hanger hook or the equivalent 22 so that in the use of the gambrel or grapple the animal 21 will be hung in suspended position.

Fixed to the saddle 12 inwardly with respect to the hooks 17 are brackets 23 in which are journaled guide rollers 24 having contact with the hooks 17 and these rollers function as antifriction rollers to allow free movement of the hooks 17 through the holes 14 in the ends 13 of the saddle.

It will be apparent from Figure 1 of the drawing that when the animal 21 is engaged with the gambrel or grapple the weight of the animal causes the spreading of the hooks 17 and corresponding spreading of the legs 20 of such animal as the runner 15 moves downwardly on the stem or shank 10 as the hooks 17 play through the holes 14 in the ends 13 of the saddle. The hooks 17 when playing through the holes 14 constantly have contact with the rollers 24 as journaled in the brackets 23 on the saddle 12.

What is claimed is:

1. A gambrel comprising a shank, a saddle plate fixed medially thereof to the shank and having upwardly bent ends disposed in upward divergent relation to each other and at an angle to said plate, each of said bent ends having an opening therein the axes of which are downwardly divergent, a peripherally grooved roller supported by the saddle plate adjacent each bent end and overhanging slightly its corresponding opening, a mounting slidable on said shank, and hooks having shanks pivoted to said mounting within the confines of said rollers and slidably received by the openings and the grooves in the rollers.

2. A gambrel comprising a shank, a saddle plate fixed medially thereof to the shank and having upwardly bent ends disposed in upward divergent relation to each other and at an angle to said plate, each of said bent ends having an opening therein the axes of which are downwardly divergent, a peripherally grooved roller supported by the saddle plate adjacent each bent end and overhanging slightly its corresponding opening, a mounting slidable on said shank, and hooks having shanks pivoted to said mounting within the confines of said rollers and slidably received by the openings and the grooves in the rollers, said rollers being disposed in the downward path of movement of the mounting so as to limit the downward movement of the mounting and shanks of the hooks to prevent jamming of the parts.

OTTO J. PAWLITSCHEK.